3,235,539
POLYMERS OF VINYL ESTERS OF BRANCHED CHAIN COPOLYMERIC ACIDS
Herman Wexler, Summit, and John A. Manson, New Providence, N.J., assignors, by mesne assignments, to Cumberland Chemical Corporation, New York, N.Y., a corporation of Delaware
No Drawing. Filed Dec. 28, 1959, Ser. No. 862,072
4 Claims. (Cl. 260—89.1)

This invention relates to crystalline vinyl ester polymers and to the production of such crystalline polymers.

Various methods have previously been employed for polymerizing vinyl esters. Such prior techniques generally have involved free radical polymerization mechanisms at elevated temperatures. The polymers produced by such methods are amorphous polymeric vinyl esters.

It is an object of this invention to provide new and useful crystalline polymers and describe the method of producing them.

It is the further object of this invention to provide for the production of crystalline vinyl ester polymers.

Other objects will become apparent from the following discussion.

It has been found that high yields of crystalline polymer can be obtained by polymerizing certain vinyl monomeric esters as more fully described hereinafter in the presence of an organometallic initiator at low temperatures.

In selecting a suitable vinyl ester monomer, a number of theoretical factors must first be considered in order to describe more completely the scope of our invention. It was assumed that the crystallizability of a polymer, particularly in the case of vinyl esters, would be directly dependent upon the linearity of the polymer chain: the higher the degree of linearity, the greater the probability of obtaining a crystalline polymer. The assumption that crystallizability was a function of linearity was borne out by our experiments with vinyl acetate and other straight-chain aliphatic vinyl esters. As the length of the chain increased however, the crystallizability decreased because the longer chain aliphatics tended to branch under polymerization conditions. This branching impeded crystallizability.

In addition to the above, it was further postulated that if bulky side groups could be introduced into vinyl esters, the resulting steric hindrances might influence the mode of addition of each succeeding monomer unit, thereby causing it to add in an alternating manner. The result would be a syndiotactic polymer. Accordingly a number of vinyl ester monomers having bulky side groups situated reasonably near the linear chain were selected as compounds which might produce greatly increased yields of crystalline polymer. At low temperatures and in the presence of the relatively mild organometallic catalysts, these vinyl esters yielded crystalline polymers in quantities heretofore unobtainable.

In accordance with the present invention, the vinyl ester monomers polymerized to produce high yields of crystalline polymer have the general formula

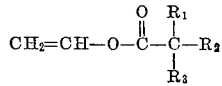

wherein $R_1$ is selected from the group consisting of hydrogen and alkyl radicals having 1 to 3 carbon atoms, and $R_2$ and $R_3$ are alkyl radicals having 1 to 5 carbon atoms.

In carrying out the invention, a trialkyl aluminum compound or a dialkyl aluminum hydride is employed as polymerization initiator. The aluminum compound initiators preferably contain lower alkyl groups, i.e. about $C_1$–$C_5$ alkyl groups. Triisobutyl aluminum is an especially preferred initiator. Other specific suitable initiators include trimethyl aluminum, tripropyl aluminum, triisopropyl aluminum, tributyl aluminum, diisobutyl aluminum hydride, dimethyl aluminum hydride, and dipropyl aluminum hydride, as well as aluminum compounds containing different alkyl groups in the same molecule. In practice of the invention, the polymerization initiator is employed in amounts ranging from about 0.1 to 10% by weight based on the monomer. A preferred range of initiator concentration is about 0.5 to 5% by weight of monomer.

In order to prepare crystalline polymeric vinyl esters, polymerization temperatures of the order of about $-100°$ C. to $+30°$ C. are preferably employed. Bulk or solution polymerization techniques can be used. Precipitating solvents in which the monomer is soluble but in which the formed polymer is not soluble can be used. Examples of suitable precipitating solvents include hexane, octane, decane, pentane, gasoline, diethyl ether, and the like. The solvent is used in amount sufficient to precipitate polymer as formed from the monomer solution.

Specific examples of vinyl ester monomers which can be polymerized in accordance with the invention to produce crystalline products include vinyl isobutyrate, vinyl pivalate, vinyl-2-ethyl-4-methyl pentanoate, and the like.

Through practice of the invention product polymers having very high crystallinity, e.g. 25–50%, are readily formed in high yield. It has further been found that the product crystallinity can be greatly increased by subjecting the crystalline polymer to an annealing operation wherein the polymer is heated to its melting point and allowed to slowly cool. Polymers having 100% crystallinity have been made by this method.

Polymerization times can range widely, for example, from several hours to approximately two weeks. Usually polymerization times of about five hours to three days are preferred. When long polymerization times are employed at very low temperatures, significant chain branching may occur as a result of the prolonged contact of the polymerization mixture with the initiator. The long polymerization times may be greatly lessened through the use of solvents such as tetrahydrofuran which increase the rate of polymerization.

The following examples illustrate the invention:

*Example I*

About 20 ml. of vinyl isobutyrate were placed in a bottle. The bottle was flushed with nitrogen and capped. Triisobutyl aluminum in amount of about 3% by volume of the monomer was injected with a hypodermic syringe into the bottle containing the monomer and the resulting mixture was maintained at 25° C. for 3 days.

After 3 days at 25° C. the bottle was opened and the polymer product was recovered by evaporating volatile materials therefrom. The polymer product was about 25% crystalline as determined by X-ray diffraction measurements. The product had an absorption maximum at 4.5 A. The softening point of the polymer was 90–95° C. as contrasted with 70–75° C. for amorphous poly(vinyl isobutyrate).

*Example II*

Vinyl-2-ethyl-4-methyl pentanoate was polymerized and the polymer recovered as described in Example I.

The polymer product was 50% crystalline as determined by X-ray diffraction measurements. The poly (vinyl-2-ethyl-4-methyl pentanoate) had absorption maxima at 11.8 A., 8.8 A., 5.2 A. and 4.5 A.

The polymer was heated slowly until it began to melt. Before the polymer was completely melted it was slowly cooled to room temperature. The X-ray diagram of the thusly annealed polymer showed it was substantially completely crystalline.

The polymer product before annealing had a softening point of 195–205° C. as contrasted with a softening point of 80–85° C. for amorphous poly(vinyl-2-ethyl-4-methyl pentanoate).

*Example III*

Vinyl pivalate was polymerized and the product recovered by the method of Example I.

The poly(vinyl pivalate) was a very hard microcrystalline product. X-ray measurements showed broad absorption maxima at 9.55 A. and 4.8 A.

The crystalline polymers of this invention find wide utility in a variety of applications. The polymers are useful as coatings, adhesives, in the formation of shaped articles, and the like. In applications where characteristics such as higher melting points are important, the polymers of this invention are greatly superior to the amorphous polymers prepared by prior known techniques.

We claim:

1. The process for preparing crystalline polyvinyl esters which comprises polymerizing a vinyl ester in bulk in an oxygen free atmosphere at a temperature of from about −100° C. to about +30° C. in contact with an organometallic initiator consisting of a compound selected from the group consisting of trialkyl aluminum and dialkyl aluminum hydride compounds wherein said alkyl groups contain from 1 to 5 carbon atoms, said compound being in a concentration of 0.1 percent to 10 percent by weight based on monomer, said vinyl ester having the formula

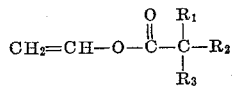

wherein $R_1$ is selected from the group consisting of hydrogen and an alkyl radical having 1 to 3 carbon atoms and $R_2$ and $R_3$ are alkyl groups having 1 to 5 carbon atoms.

2. The process of preparing crystalline poly(vinyl-2-ethyl-4-methyl pentanoate) comprising polymerizing vinyl 2-ethyl-4-methyl pentanoate in bulk in an oxygen free atmosphere in contact with a polymerization initiator consisting of triisobutyl aluminum in a concentration of 0.1 percent to 10 percent by weight based on monomer at a temperature from −15° C. to 25° C.

3. The process of preparing crystalline poly(vinyl pivalate) comprising polymerizing vinyl pivalate in bulk in an oxygen free atmosphere in contact with a polymerization initiator consisting of triisobutyl aluminum in a concentration of 0.1 percent to 10 percent by weight based on monomer at a temperature from −15° C. to 25° C.

4. The process of preparing crystalline poly(vinyl isobutyrate) comprising polymerizing vinyl isobutyrate in bulk in an oxygen free atmosphere in contact with a polymerization initiator consisting of triisobutyl aluminum in a concentration of 0.1 percent to 10 percent by weight based on monomer at a temperature from −15° C. to 25° C.

References Cited by the Examiner

UNITED STATES PATENTS

| 2,559,630 | 7/1951 | Bullitt | 260—610 |
| 2,608,555 | 8/1952 | Bullitt | 260—610 |
| 2,648,655 | 8/1953 | Vandenberg | 260—89.1 |
| 2,697,700 | 8/1953 | Uraneck et al. | 260—89.1 |
| 2,841,574 | 7/1958 | Foster | 260—80 |
| 2,842,474 | 8/1958 | Pratt | 260—89.1 |
| 2,932,633 | 4/1960 | Juveland | 260—94.9 |

FOREIGN PATENTS

| 585,396 | 2/1947 | Great Britain. |
| 819,291 | 9/1959 | Great Britain. |
| 833,147 | 4/1960 | Great Britain. |

OTHER REFERENCES

Tobolsky: American Scientist, vol. 45 pages 34–43, January 1957.

Natta: Angewandte Chemie, vol. 68, No. 12, pages 393–424, June 1956.

Natta: SPE Journal, vol. 15, No. 3, pages 373–382, May 1959.

Furukawa et al.: Jour. of Polymer Sci., pp. 234–5, vol. 28 (1958), Gaylord et al. Linear and Stereoregular Addition Polymers p. 487 (1959), Interscience Publishers, Inc., N.Y.

Huggins: Journal American Chemical Society, vol. 66, 1944, pages 1991 and 1992.

JOSEPH L. SCHOFER, *Primary Examiner.*

HAROLD N. BURSTEIN, PHILIP E. MANGAN, JOSEPH R. LIBERMAN, *Examiners.*